(12) United States Patent
Black

(10) Patent No.: US 8,989,243 B1
(45) Date of Patent: Mar. 24, 2015

(54) POWER LINE DEVICE WITH DIRECTIONAL COUPLER

(75) Inventor: William C. Black, Ames, IA (US)

(73) Assignee: Northern Microdesign, Inc., Chapel Hill, NC (US)

( * ) Notice: Subject to any disclaimer, the term of this patent is extended or adjusted under 35 U.S.C. 154(b) by 255 days.

(21) Appl. No.: 13/073,206

(22) Filed: Mar. 28, 2011

Related U.S. Application Data

(60) Provisional application No. 61/318,151, filed on Mar. 26, 2010.

(51) Int. Cl.
H04B 1/38 (2006.01)

(52) U.S. Cl.
USPC .......................... 375/222; 375/220; 375/356

(58) Field of Classification Search
USPC .......................................... 375/222, 220, 356
See application file for complete search history.

(56) References Cited

U.S. PATENT DOCUMENTS

| | | | |
|---|---|---|---|
| 2002/0109585 A1* | 8/2002 | Sanderson | 340/310.01 |
| 2006/0250223 A1* | 11/2006 | Koga et al. | 340/310.11 |
| 2007/0194949 A1* | 8/2007 | Swarztrauber et al. | 340/870.07 |

* cited by examiner

Primary Examiner — Kabir A Timory
(74) Attorney, Agent, or Firm — McKee, Voorhees & Sease

(57) ABSTRACT

A power line carrier modem is configured for coupling to AC power lines. The power line carrier modem includes a processor, an output from the processor, a plurality of inputs to the processor, and a directional coupler operatively connected to the output, the plurality of inputs, and the AC power lines. The power line carrier modem may further include a digital-to-analog-converter operatively connected to the output from the processor. The output from the processor may be an output bus. The power line carrier modem further includes an analog-to-digital-converter operatively connected to the plurality of inputs to the processor. The power line carrier modem may be configured to perform Vector Network Analysis functions. The power line carrier modem may be configured to indicate PLC modem transmit frequencies being reflected from the AC power lines or the line coupler. The transmitter functions may be implemented in software by the processor to provide a transmit output on the output line. Receiver functions may also be implemented in software by the processor.

16 Claims, 18 Drawing Sheets

1

POWER LINE DEVICE WITH DIRECTIONAL COUPLER

CROSS-REFERENCE TO RELATED APPLICATIONS

This application claims priority under 35 U.S.C. §119 to provisional application Ser. No. 61/318,151 filed Mar. 26, 2010, herein incorporated by reference in its entirety.

GRANT REFERENCE

This invention was made with government support under Contracts W31P4Q-05-C-R067 and W31P4Q-06-C-0221 awarded by the U.S. Army Aviation and Missile Command. The government has certain rights in the invention.

FIELD OF THE INVENTION

The present invention relates to power line carrier (PLC) modems. More particularly, the present invention relates to improved power line carrier modems which incorporate a directional coupler.

BACKGROUND OF THE INVENTION

In power line communications, power lines are used as a transmission medium. Power Line Carrier modems transmit high frequency signals over a power line and the signals may be narrow-band (perhaps a few kHz wide) or up to broad-band (many MHz wide). These devices are usually capacitively or inductively coupled onto the power line so as to minimize or eliminate any 50/60 Hz or other high voltage low frequency signals from being transferred into the modems. It is a common problem, however, that most PLC modem transmitters do not properly match the high-frequency characteristics of the power line and hence, transmit with less than optimal efficiency and transmit in frequency ranges where little power is actually passed onto the power lines. Impedance mismatches can also affect the output amplifier waveform and may introduce undesired distortion, intermodulation products and other undesirable characteristics. Also, PLC modems do not possess any capability of sensing subtle changes in power line characteristics as may be noted by measurement of S-parameters for the power lines. What is needed is an improved PLC modem which addresses these shortcomings.

SUMMARY OF THE INVENTION

Therefore, it is a primary object, feature, or advantage of the present invention to improve over the state of the art.

It is a further object, feature, or advantage of the present invention to provide an improved PLC modem.

It is a still further object, feature, or advantage of the present invention to provide a PLC modem that allows for properly matching the high-frequency characteristics of the power line and avoids problems associated with impedance mismatch.

Yet a further object, feature, or advantage of the present invention is to provide a PLC modem that allows for sensing detection of mismatch.

One or more of these and or other objects, features, or advantages of the present invention will become apparent from the specification and claims that follow. No single embodiment of the present invention need provide all of these objects, features, or advantages and the present invention is not to be limited to or by these objects, features, or advantages.

According to one aspect of the present invention, a power line carrier modem is configured for coupling to AC power lines. The power line carrier modem includes a processor, an output from the processor, a plurality of inputs to the processor, and a directional coupler operatively connected to the output, the plurality of inputs, and the AC power lines. The power line carrier modem may further include a digital-to-analog-converter operatively connected to the output from the processor. The output from the processor may be an output bus. The power line carrier modem may further include an analog-to-digital-converter operatively connected to the plurality of inputs to the processor. The power line carrier modem may be configured to perform Vector Network Analysis functions. The power line carrier modem may be configured to indicate PLC modem transmit frequencies being reflected from the AC power lines or the line coupler. The transmitter functions may be implemented in software by the processor to provide a transmit output on the output line. Receiver functions may also be implemented in software by the processor.

According to another aspect of the present invention, a device is provided which includes a processor, a transmit output operatively connected to the processor; and a directional coupler operatively connected between the processor and AC power lines. The processor is configured for communicating a data signal over the AC power lines through the transmit output. The directional coupler provides an output to the processor and a coupled output to the processor. The processor may be adapted to process the output and the coupled output to perform vector network analysis functions. The processor may be adapted to process the output and the coupled output to analyze reflectance. The processor may be adapted to adjust the transmit output using the coupled output. The processor may be configured to perform transmit functions and receive functions.

According to another aspect of the present invention, a method of communicating data over AC power lines includes operatively connecting a directional coupler to the AC power lines; and using a coupled output of the directional coupler in a power line carrier modem transmitter. The coupled output of the directional coupler may be used in performing vector network analysis functions. The coupled output of the directional coupler and an output of the directional coupler may be used in determining power line carrier modem transmit frequencies being reflected from the AC power lines or line coupler.

According to another aspect of the present invention, a device includes a processor, a transmitter operatively connected to the processor, and a directional coupler operatively connected between the transmitter and AC power lines. The processor is configured for communicating a data signal over the AC power lines.

According to another aspect of the present invention, a power line carrier modem is configured for coupling to AC power lines. The power line carrier modem includes a processor, a digital-to-analog converter operatively connected to the output from the processor, an analog-to-digital converter operatively connected to processor, and a directional coupler operatively connected to the digital-to-analog-converter, the analog-to-digital converter, and the AC power lines. The processor is configured to perform transmit functions for transmitting data signals over the AC power lines.

DETAILED DESCRIPTION

Figure 1:
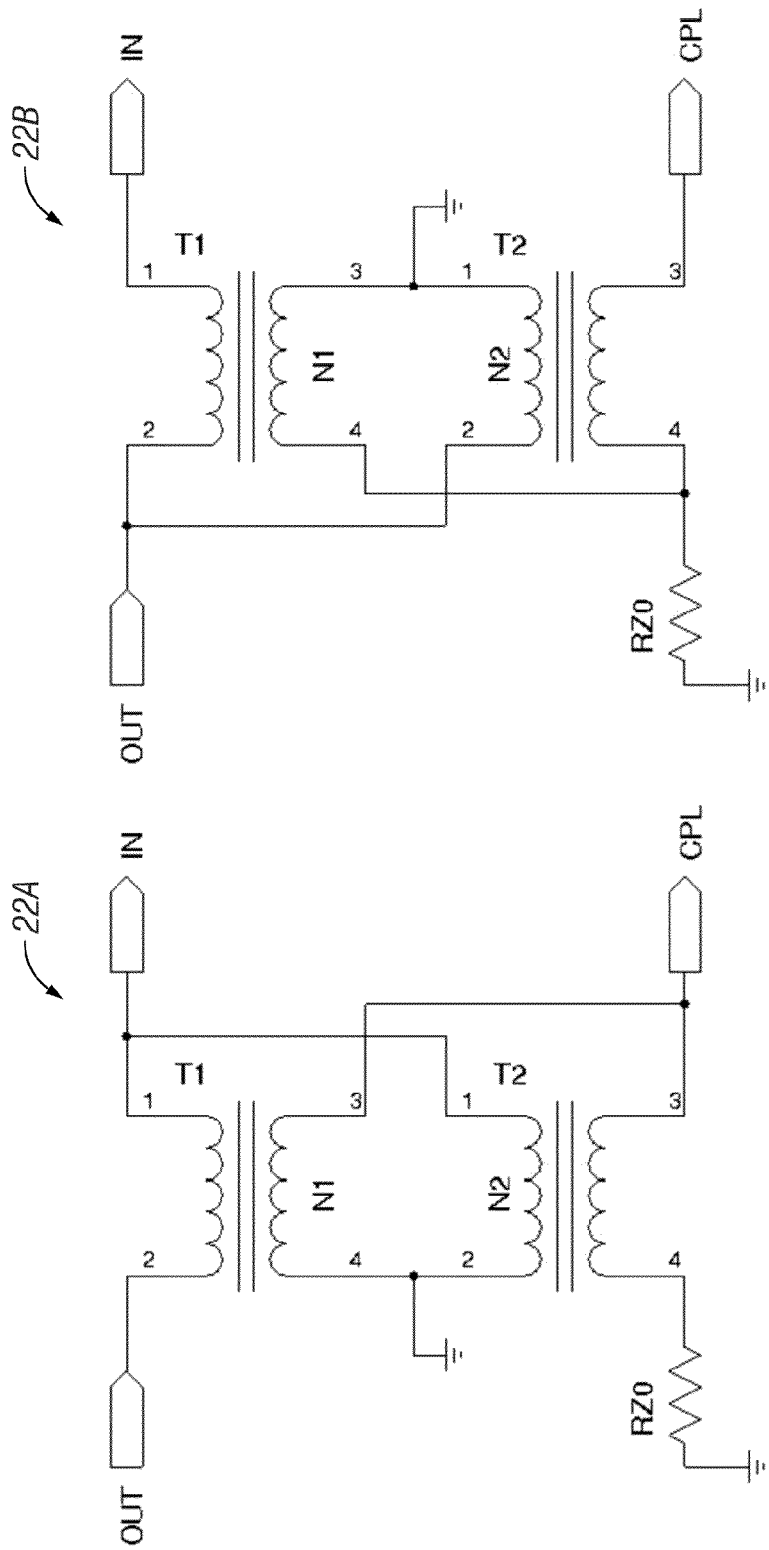
FIG. 1 provides schematic representations of directional couplers of the present invention.

The present invention provides for adding a directional coupler to the output of the PLC transmitter either prior to or as part of the power line coupler. A directional coupler may be realized in many ways as is commonly known in the art. Two examples of directional couplers 22A, 22B are shown in FIG. 1.

Figure 2:
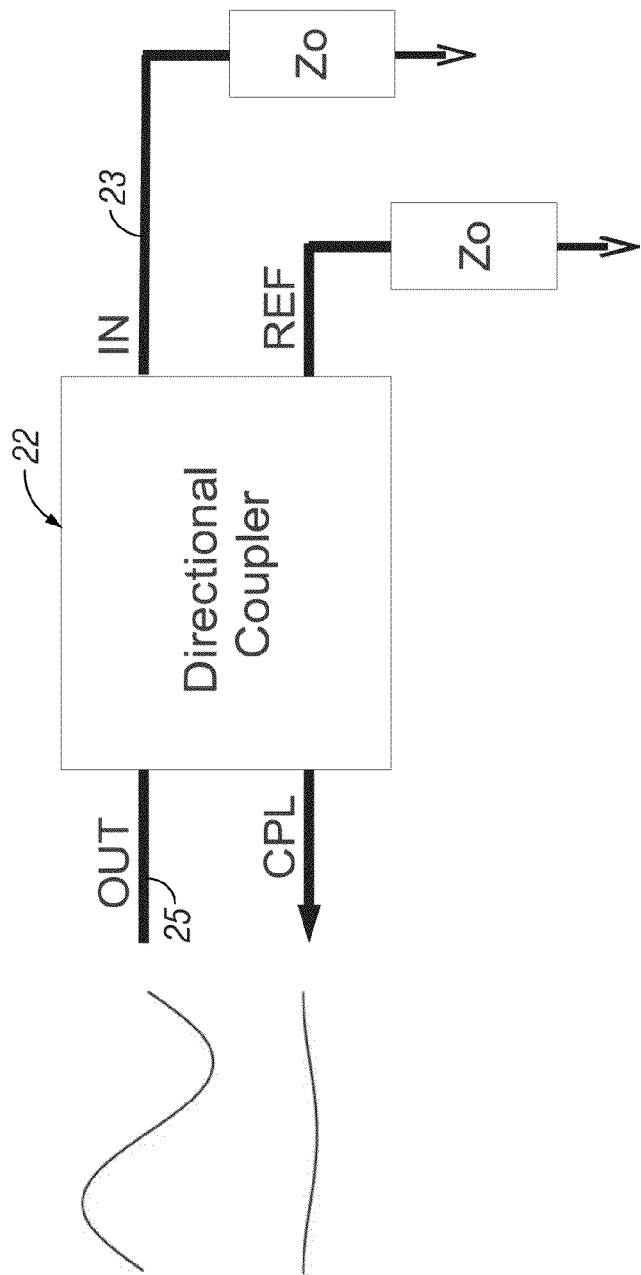
FIG. 2 illustrates a directional coupler with matched impedances and signal applied to OUT.
Figure 3:
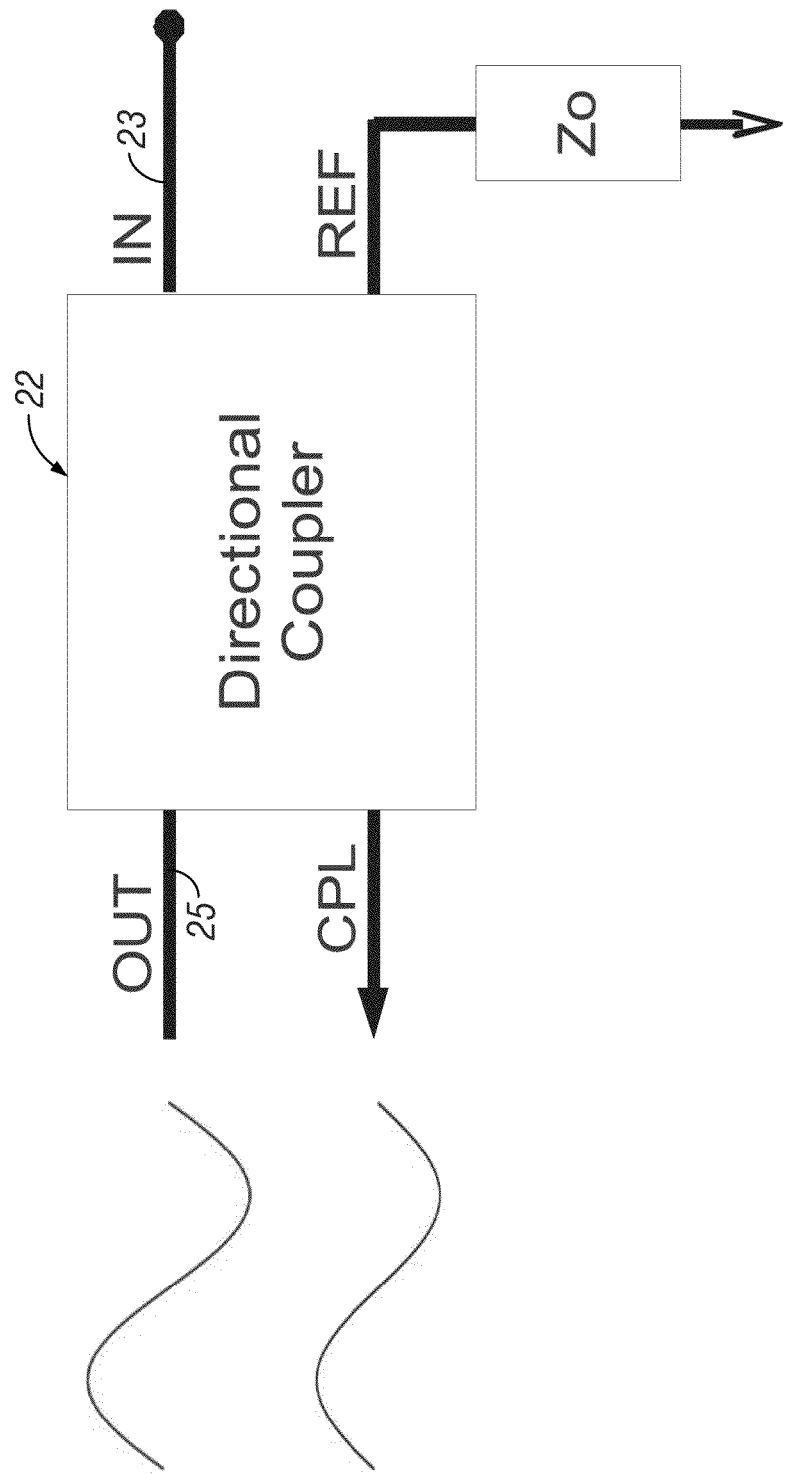
FIG. 3 illustrates a directional coupler with OPEN IN pin (coupler is similar to LEFT embodiment in FIG. 1.
Figure 4:
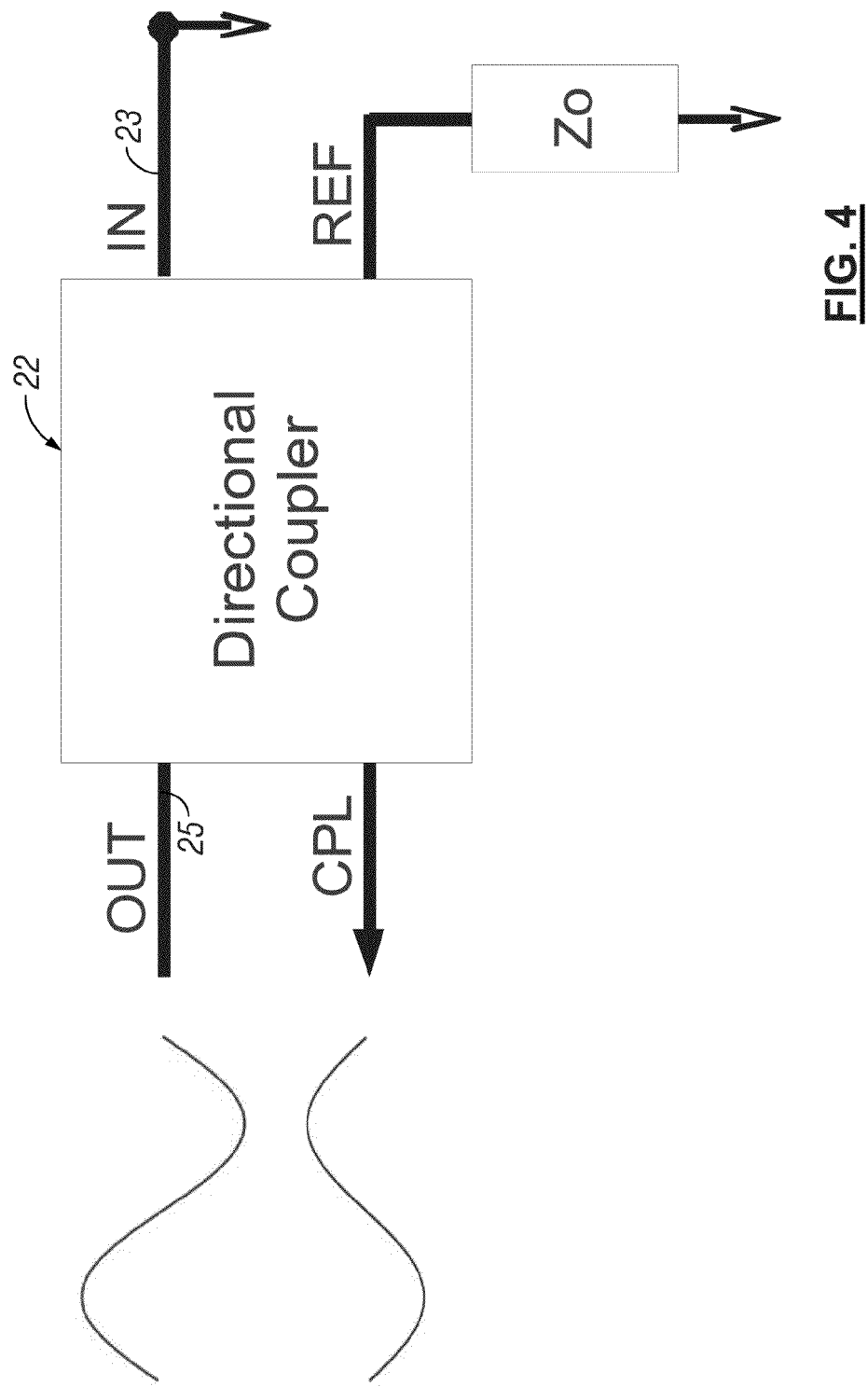
FIG. 4 illustrates a directional coupler with SHORTED IN pin (coupler is similar to LEFT embodiment of FIG. 1).

Directional couplers typically have three or four terminals and are commonly used to selectively couple signals onto the Coupled terminal based upon mismatches being present between various terminals. One use of a directional coupler is to serve as a "reflectometer" and provide a means of measuring signal being reflected from a load. The directional coupler is usually designed to have a characteristic impedance (commonly 50 or 75 Ohms) which is application dependant. In a typical application, shown in FIGS. 2-4, the Coupled output is seen to vary in amplitude and phase depending upon the impedance applied to the directional coupler IN pin 23. If a signal is applied to the OUT pin 25 and an impedance is applied to the IN pin 23 that is very similar to that applied at the Reference pin, the Coupled output is usually small as shown in FIG. 2. If the IN pin 23 is shorted or open, however, the Coupled output is much larger and of either about 0 degree phase or 180 degree phase shift compared to the signal applied to the OUT pin 25 based upon it being the inverting or noninverting implementation as shown in FIGS. 3 and 4. (The left side of FIG. 1 has about zero phase shift with the IN pin open whereas the right side of FIG. 1 has about a zero phase shift with IN shorted to ground.)

The addition of a directional coupler to a PLC modem or PLC transmitter has several distinct advantages: (1) it may be used to enable a Vector Network Analysis function into the PLC modem or PLC transmitter and (2) it will indicate PLC modem transmit frequencies that are being reflected from the power line or line coupler as any such transmitted signals will appear at an enhanced amplitude at the coupled output and (3) it can reduce waveform degradation in the output amplifier that is driving the Directional Coupler because of significant impedance mismatches at the load.

A PLC modem with a directional coupler may be used as a vector network analyzer. The PLC modem with directional coupler may also be used for monitoring reflected power line signals. These examples are discussed in detail below.

Figure 5:
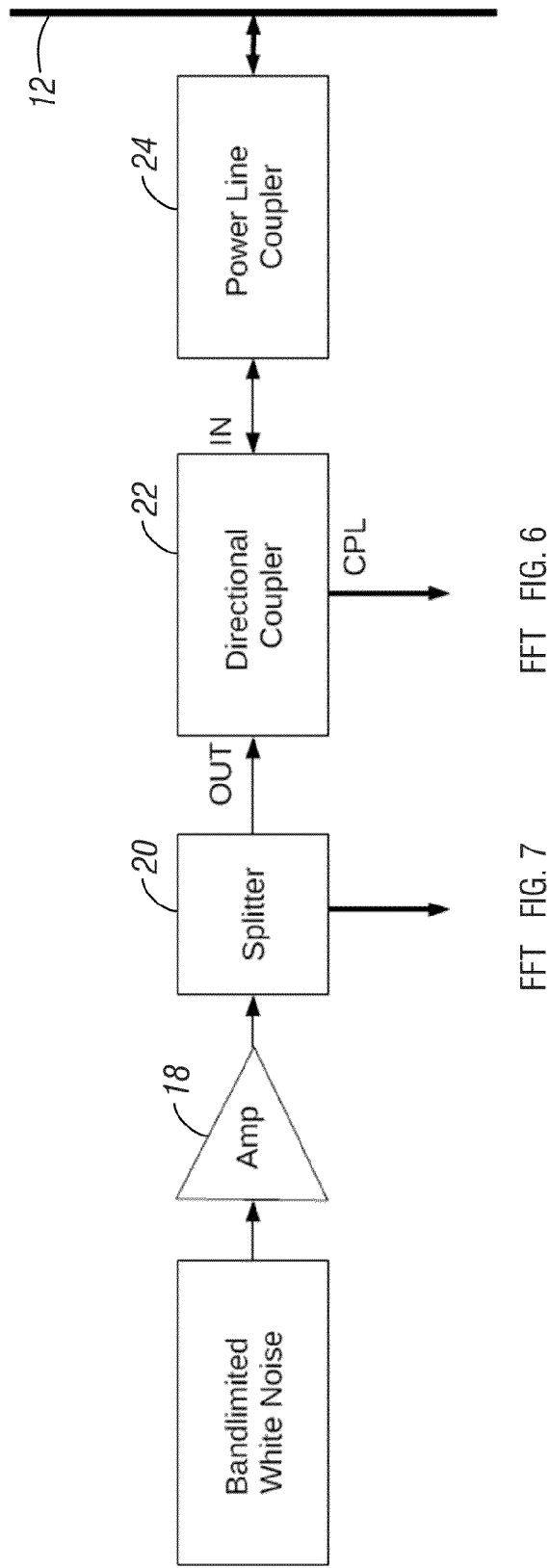
FIG. 5 illustrates a block diagram of a power line transmitter test setup.

For this example we refer to the test setup shown in FIG. 5. As shown in FIG. 5, bandlimited white noise is generated and sent to an amplifier 18 which is connected to a splitter 20, with one output operatively connected to a directional coupler 22 which is coupled to a power line 12 with the power line coupler 24. Here we generate white noise (spectrally flat) between about 3.25-4.25 MHz and apply it to the power line 12. Of course, in a PLC transmitter, this signal could be data transmitted in any of various formats and over the same or different frequency ranges.

Figure 6:
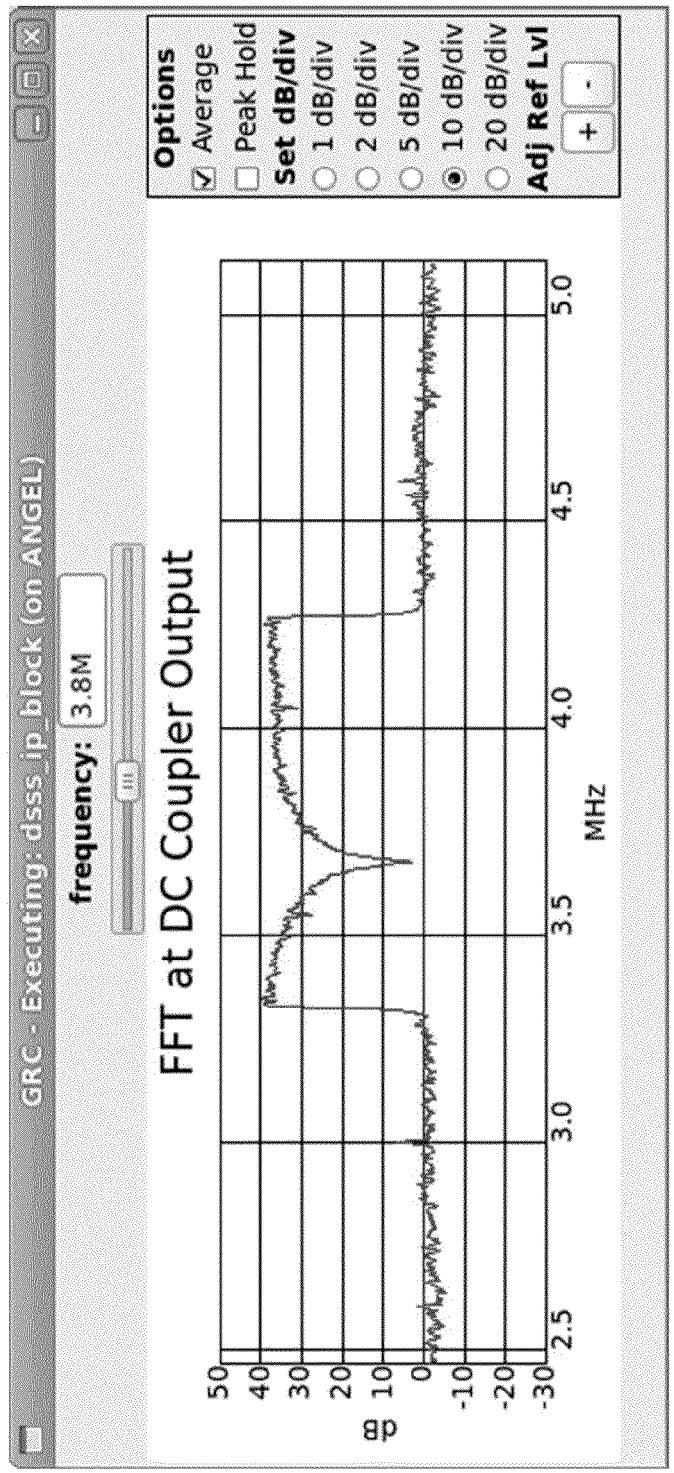
FIG. 6 is a graph illustrating coupler output showing large change around 3.7 MHz.
Figure 7:
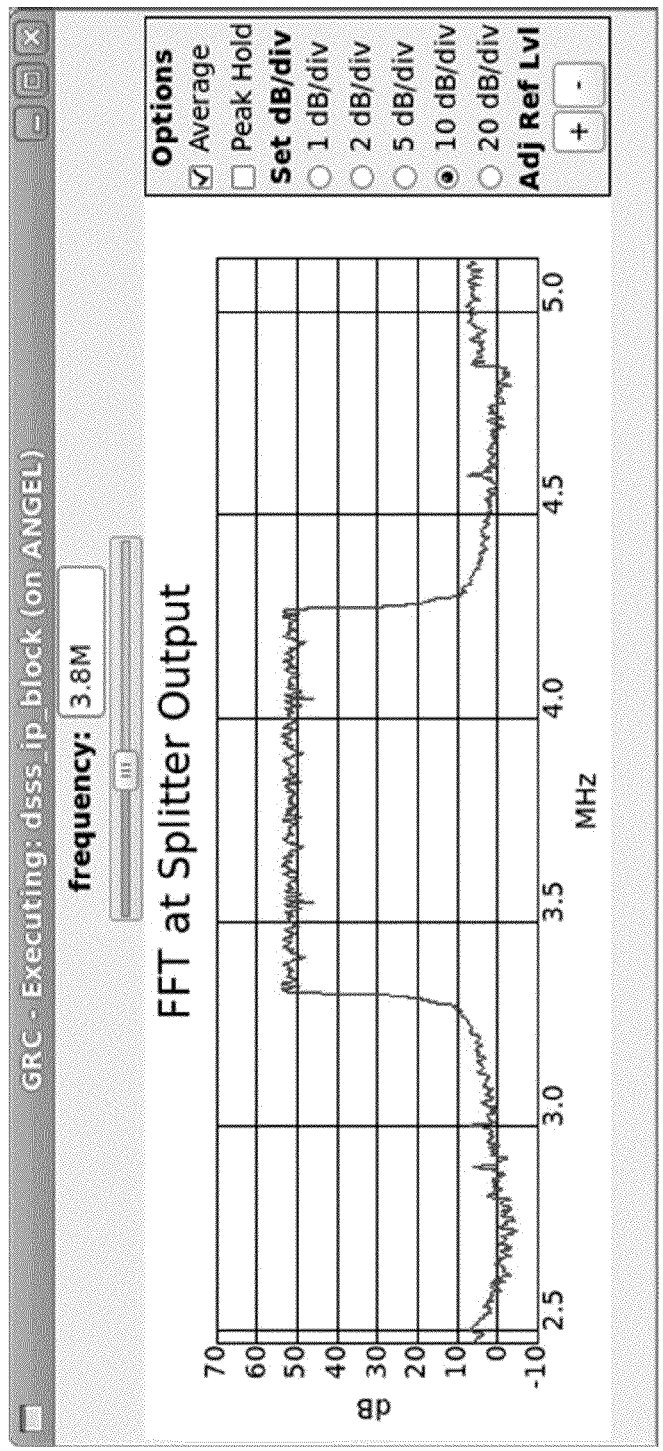
FIG. 7 is a graph illustrating splitter output for the case shown in FIG. 6 showing no obvious amplifier change.
Figure 8:
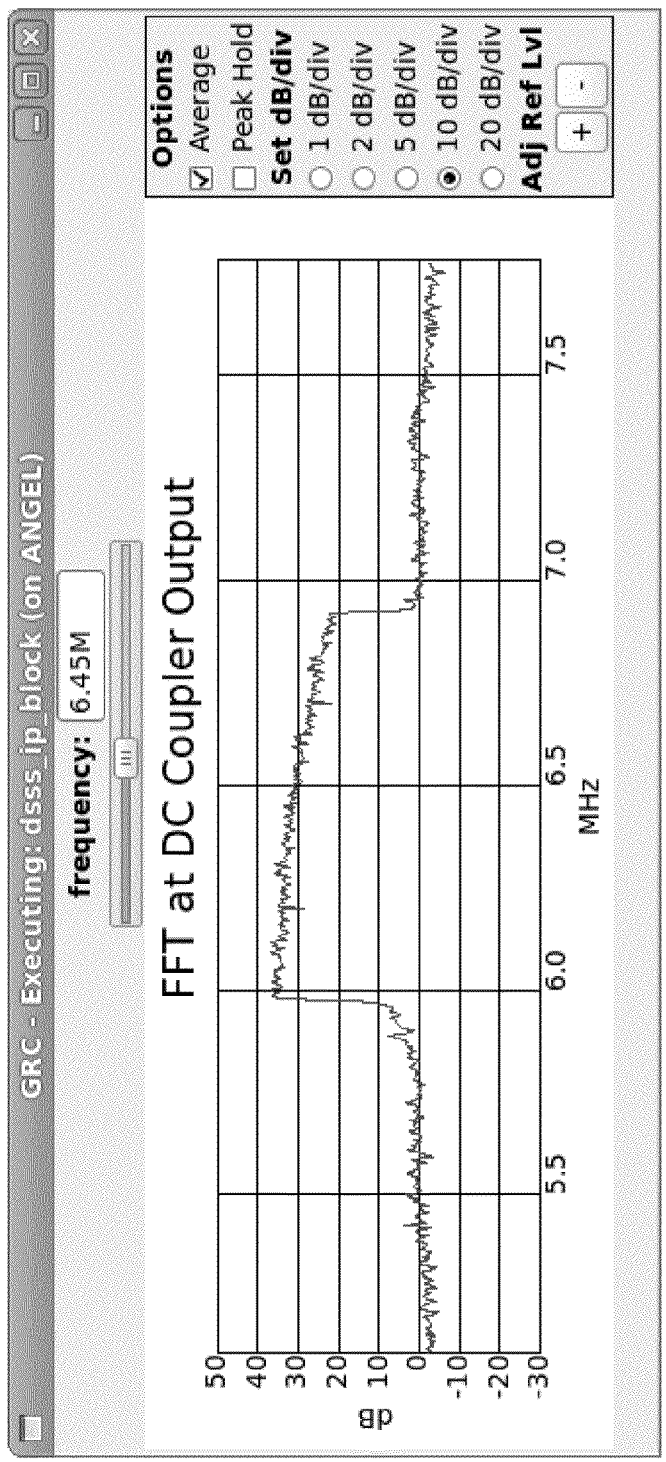
FIG. 8 is a graph illustrating coupler output showing large change between about 6 and 7 MHz.
Figure 9:
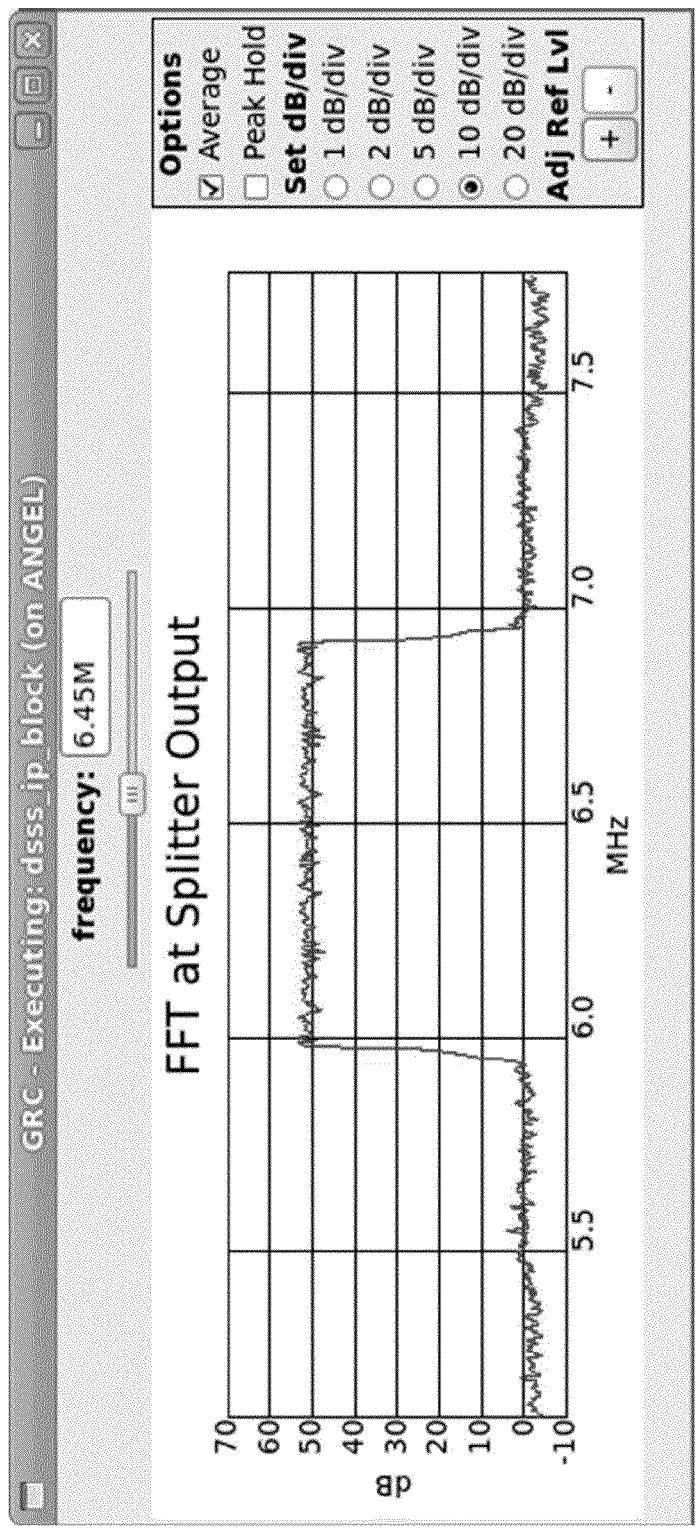
FIG. 9 is a graph illustrating splitter output for the case shown in FIG. 8 showing no obvious amplifier change.

As is clearly shown in the FFT of the COUPLED terminal there is a large change in power line characteristics at about 3.7 MHz as shown in FIG. 6 although no obvious change is evident in the splitter output as shown in FIG. 7. This situation is repeated at a different frequency as shown in FIGS. 8 and 9.

One use of the present invention is to simultaneously perform s-parameter or reflectance measurements on many frequencies at once. A traditional VNA only uses one at a time, but with methods such as OFDM, many tones are transmitted at once (see FIGS. 6-9) and all may be used for measuring reflectance at that particular frequency and at the same time.

It should also be appreciated that the processor may implement transmitter and receive functions in software. For example, a software defined radio system (SDR) Universal Software Radio Peripheral (USRP) may be used. The USRP is one example of a high speed USB based board for making software radios and is available from Ettus Research LLC. A software radio need not be used. In addition, the use of receive functions is optional.

It should be appreciated that the processor may perform any number of functions using the coupled output from the directional coupler as well as the output from the directional coupler. For example, the processor may use the coupled output in performing an analysis and then use the results of the analysis as part of a feedback loop such as to modify transmit output or perform other functionality.

Figure 10:
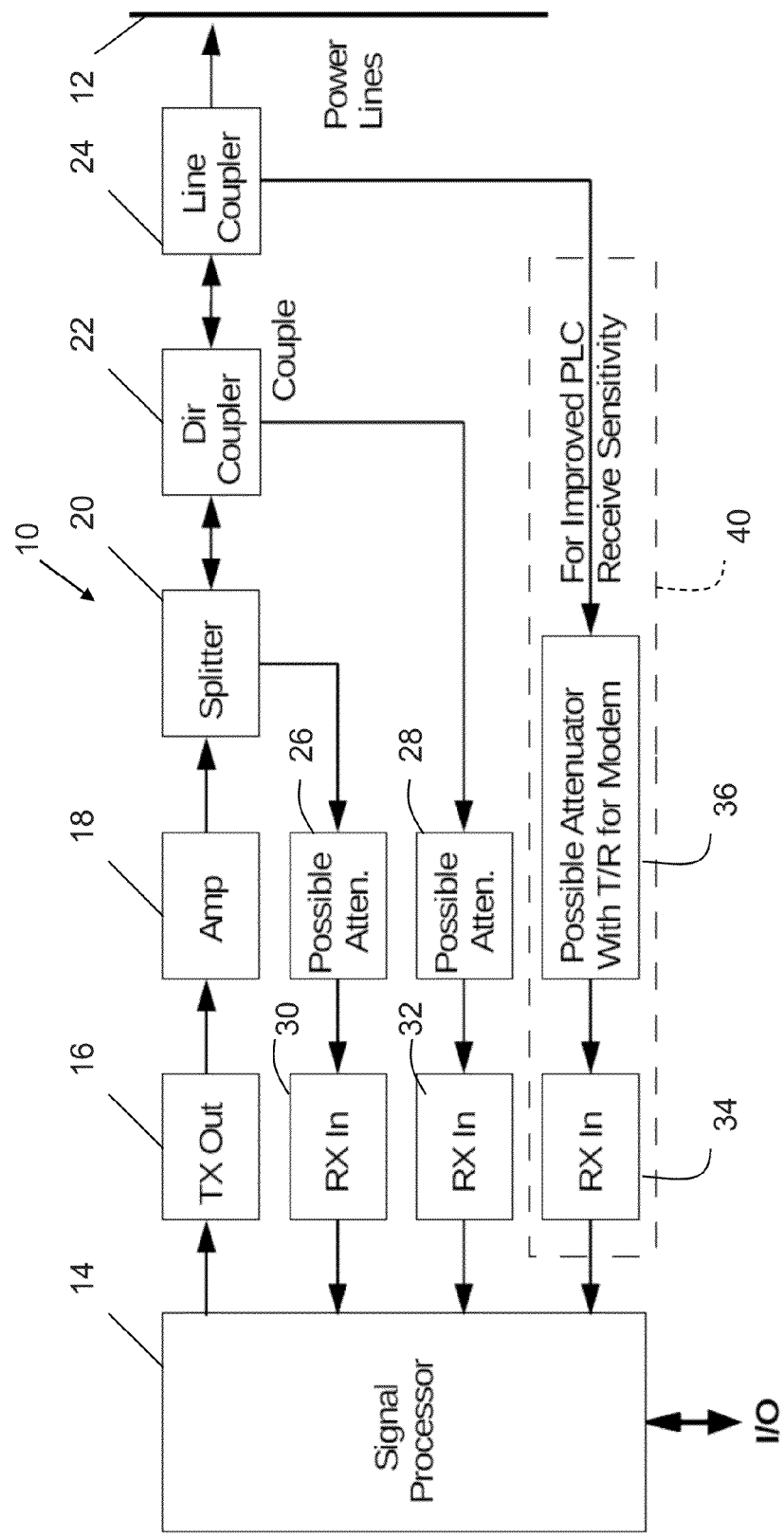
FIG. 10 is block diagram of a PLC modem showing presence of a directional coupler.

A block diagram of a PLC modem showing the presence of a Directional Coupler and Power Line Coupler is shown in FIG. 10. Note that the TX Out line refers to a D/A output channel and the various RX In lines refer to A/D converter input lines.

As shown in FIG. 10 a PLC modem 10 is provided which is coupled to AC power lines 12. The PLC modem 10 includes a signal processor 14 with an output line 16, and input lines 30, 32. The input lines 30, 32 are part of a transmit equalizer. Input line 34, where present would be associated with a receiver or receive functions.

An amplifier 18 is operatively connected to the transmitter output 16. A splitter 20 is operatively connected between a directional coupler 22 and the amplifier 18 of the transmitter and possibly an attenuator 26 of a first input line 30. The directional coupler 22 is operatively connected between the line coupler 24 and the splitter as well as possibly an attenuator 28 associated with a second input line 32. The line coupler 24 may also be operatively connected to an attenuator 36 to an input line 34 associated with a receiver. This connection of the line coupler allows for improved PLC receive sensitivity.

Power Line S-Parameter Characterization

As previously discussed, the present invention may be used to simultaneously perform S-parameter measurements on many frequencies at once. This information is also described in the present's inventions publication [13]. Here, a simple method for performing characterization of live power lines is described that utilizes open source software and hardware and de-embedding of the line coupler response to derive S-parameters of an active power line channel. Examples of experimental results are shown that illustrate use of this technique in sensing various devices attached to the power line. This methodology should be straightforward to apply to PLC modems for the purpose of load or state sensing or improved data transmission performance. Although open source software and hardware are used, it should be appreciated that other types of hardware or software may be used.

Introduction

Measurement of high-frequency power line characteristics are relatively challenging because of the need to isolate the measurement equipment from the high-voltages present and because the characteristics themselves can be very complicated. Measurements of non-vector impedance or other lumped measurements are simpler than full S-parameters but have remained an area of active study [1,2] as they are useful for relatively simple system models. In contrast, published scattering or S-parameter results have generally used sophisticated instrumentation in laboratory type environments [3] or described relatively simple quasi-static measurements on unpowered components such as cables. Although, unpowered measurements can provide fodder for simple component models, measurement of a powered network is necessary to observe the many dynamic effects that occur on most power lines that may include thermal, mechanical and magnetic effects. S-parameter measurements of components or small networks are generally more useful than non-vector or simple lumped equivalent circuits in that methodologies are well established for calculating the performance of cascades of components for which S-parameters have been determined.

Here, we describe relatively simple methods for measuring the reflection coefficient ($S_{11}$) and transmission coefficient ($S_{21}$) up to about 30 MHz with very inexpensive hardware and examine several interesting experimental results on a real network. This method is simple enough that measurements can actually be performed in situ by PLC modem hardware with relatively simple modifications. This new capability could be used to perform improved network matching or even state sensing of nearby electrical components.

Measurement of Scattering Parameters with Calibration

Figure 11:
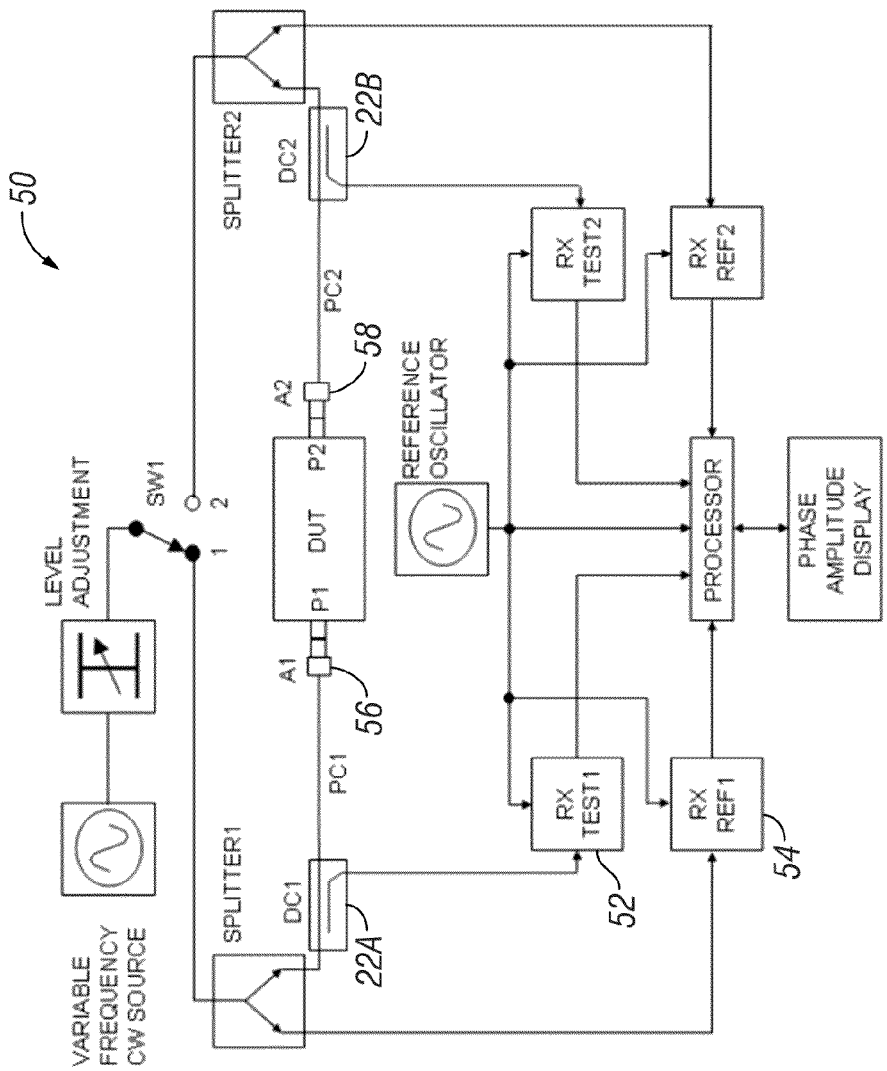
FIG. 11 illustrates an S-parameter measurement setup.

Scattering parameters are one of the commonly used complex valued properties (other commonly used parameter families are Y, Z, H, T and ABCD) of electric components that is often experimentally measured over a range of frequencies and then inserted into an S-parameter based model suitable for efficient simulation. 2D or 3D electromagnetic simulations may also be used to create an S-parameter model of components and is commonly done for structures such as transmissions lines or cables. A typical experimental setup 50 for measuring S-parameters is shown in FIG. 11. In the test arrangement shown here, the device under test (DUT), will constitute the power line channel we wish to measure and any necessary power line couplers required to protect our apparatus from the high voltage on the power lines. As these couplers will not have ideal characteristics, it is usually necessary to de-embed the characteristics of the couplers from the measurement so as to determine the characteristics of the power line itself. This de-embedding process will be described later herein.

The blocks labeled DC in FIG. 11 are directional couplers 22A, 22B that are fundamental components of this measurement method. As previously discussed, directional couplers are linear four port devices (input, transmitted, coupled and isolated) where in FIG. 11 the isolated node is not shown for simplicity but is assumed to be terminated to a resistance equal to the characteristic impedance of the system (typically 50 Ohms). Because the directional couplers are linear devices, variations in power passed into the DUT will appear as changes at the directional couplers coupled terminal that can be measured by input RX Test 1 52. The reference power can be measured via RX Ref1 54 and the reflection parameter $S_{11}$ can be inferred from the two measurements. In most systems a set of calibrations is required whereby the DUT is replaced on each end with: a short, an open connection and a 50 Ohm reference resistor and a short between nodes A1 56 and A2 58. These reference measurements allow for simple compensation of mismatches between the various ports and may only be occasionally necessary if the various measurement components and connections are time stable. The relationship between the actual (Sa) and measured (Sm) values has been addressed by Pozar [5] and McDermott [6] and is shown in (1) for the reflectance parameter.

$$S_{11}^a = \frac{(S_{11}^m - E_d)}{E_s(S_{11}^m - E_d) + E_t} \quad (1)$$

where $E_d$ is the measured reflection with the reference load, or $$E_d = S_{11,load}^m \quad (2)$$

and relative to the measured reflectance with shorted and open terminals:

$$E_s = \frac{2S_{11,load}^m - S_{11,short}^m - S_{11,open}^m}{S_{11,short}^m - S_{11,open}^m} \quad (3)$$

and $$E_t = \frac{2(S_{11,open}^m + S_{11,load}^m)(S_{11,short}^m + S_{11,load}^m)}{S_{11,short}^m - S_{11,open}^m} \quad (4)$$

where each parameter is, of course, complex and usually calculated or measured at each of the typically many measurement frequencies within the frequency range being considered. Because these measurements are at discrete frequencies and invariably contain some error, manipulation of the inferred S-parameters may be necessary to avoid S-parameter based models from appearing non-passive and making simulations unstable. (Tools such as IdEM [7] may be used for this purpose.) The case of transmission is conceptually simpler to understand, being just:

$$S_{21}^{actual} = \frac{S_{21}^m}{Cal_{21}} \quad (5)$$

where $Cal_{21}$ is the measured transfer function when the calibration short is placed between the test nodes. In a real power line network, however, $S_{21}$ is not so easily measured. Because the two test terminals may be physically far apart, the necessary interconnection and the accumulated errors from the long required test cables may be unacceptably large or the test itself may be impractical. An alternate method of inferring the transfer function for the long interconnect cases is presented in a companion paper to [13] where the response may be calculated from the correlated summation of impulse records [8].

Implementation of a Simple Vector Network Analyzer

For experiments with power line signaling, including S-parameter measurement, we have drawn on the open source GNU Radio project for both software and hardware [9]. GNU Radio is one of many free software projects following the philosophy of the original GNU Project (GNU has been represented as meaning Gnu is Not Unix) whereby project and code information is effectively donated so as to be widely available without a commercial licensing fee. In this case, GNU Radio is a collection of clever signal processing modules that allow conventional PCs to perform real-time software defined radio and other functions with relatively simple and inexpensive hardware peripherals. Besides for a conventional PC running linux, we have used the USRP (or Universal Software Radio Peripheral) from Ettus Research [10] that connects with the PC over a USB-2 cable and includes an FPGA and high-performance A/Ds and D/As and means for attaching standardized daughtercards. As the A/Ds sample at up to 64 MHz, it is straightforward to perform many signal processing functions up to about a 30 MHz bandwidth and to operate upon much higher center frequencies via either sub-sampling or a suitable RF daughtercard.

Figure 12:
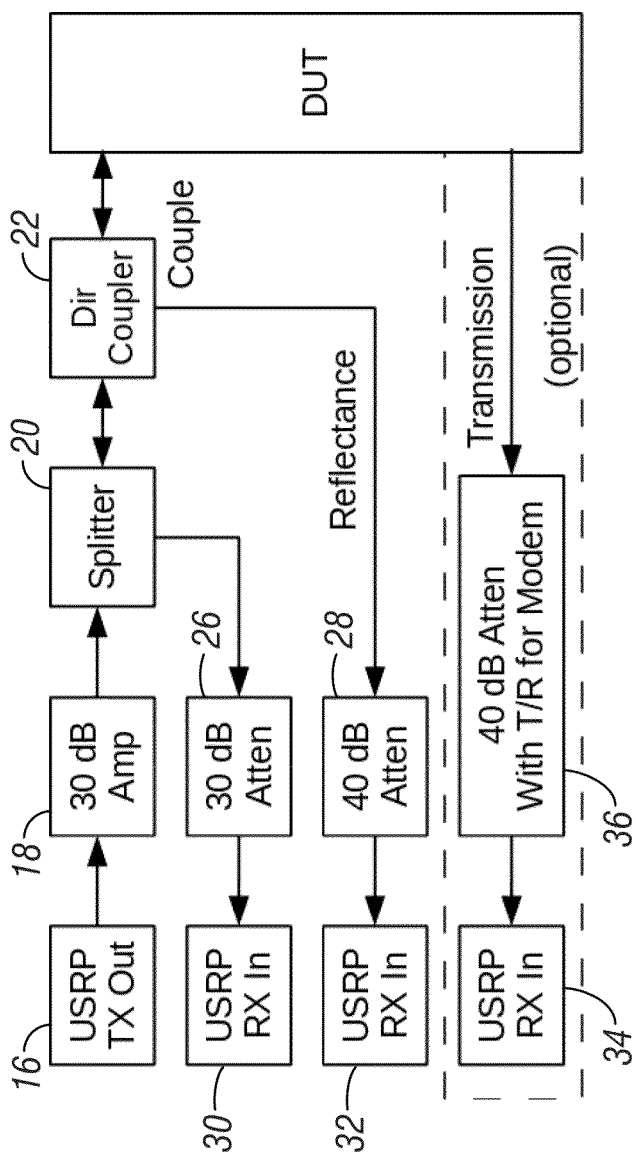
FIG. 12 illustrates a block diagram of VNA test mode.
Figure 13:
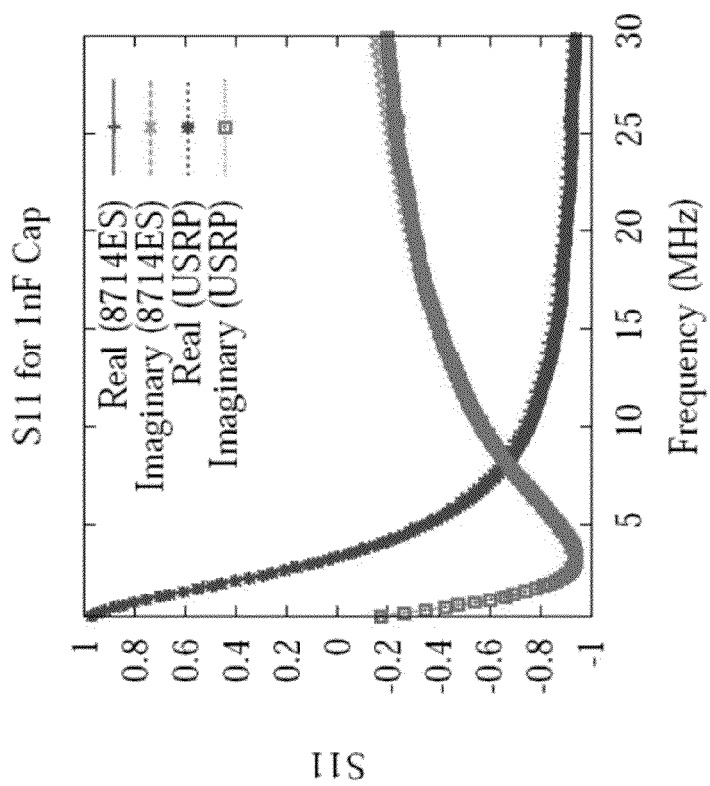
FIG. 13 illustrates measured $|S_{11}|$ of 1 nF capacitor via HP8714ES and USRP based VNAs.

The basic vector network analyzer (VNA) function has already been addressed by a GNU Radio contributor (C. Swiger) and he has generously posted his code and other descriptive material on the web [11]. Mr. Swiger's code is in several modules that follow the Pozar and McDermott methodology and includes provisions for calibrating the system via short, open and 50 Ohm terminations. We have generally followed Mr. Swiger's code, and performed our experiments using the simple LF series of Tx and Rx daughtercards that have a frequency response of from DC to about 50 MHz. This setup is simplified from the general case shown in FIG. 11 and only has a single Tx output for transmitting and a pair of Rx cards with three total channels used for receiving. Note that this basic hardware can only measure the input port reflectance ($S_{11}$) and forward transmission ($S_{21}$) as it only has a single transmission port. To measure the output port reflectance ($S_{22}$) and reverse transmission ($S_{12}$), it is necessary to swap the connections to the two test nodes and repeat the measurements. A block diagram of test node details used here is shown in FIG. 12 where the 30 dB amplifier 18 is required for long distance transmission tests. For use of this circuitry as a PLC receiver, the attenuator 26 prior to the receiver input should be used with a T/R switch. (Note that the optional receiver input is not necessary if a separate test node may be used as a transmitter.) An example of the measured input port reflectance ($S_{11}$) of a 1 nF capacitor using an HP 8714ES network analyzer and using this USRP method is shown in FIG. 13. At the resolution of this image, the traces are nearly indistinguishable.

De-Embedding Method for Removal of Line Coupler Response

Figure 14:
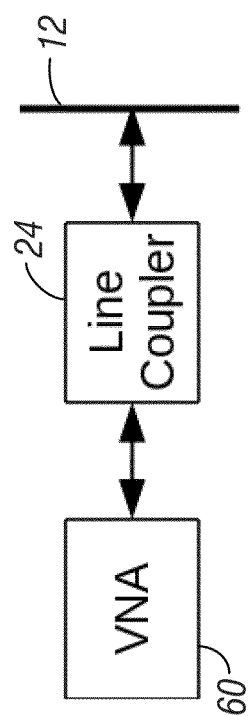
FIG. 14 illustrates presence of line coupler which complicates S-parameter power line measurement.

We have demonstrated that the USRP system may be used for S-parameter characterization of networks up to about 30 MHz. Characterization of live power lines is more difficult, however, because the USRP can only communicate with the active power lines via the line coupler that performs both low frequency blocking of the high voltage on the mains as well as surge protection. The frequency effects of the line coupler must be removed from the overall measured response, or de-embedded from the system response. A conceptual illustration of this problem is diagrammed below in FIG. 14, where the VNA 60 is coupled to the power lines 12 with the line coupler 24.

If we perform an S-parameter characterization of this system from the VNA, the intended mains network response will be significantly obscured by the line coupler. Hence, the system being measured is effectively a cascade of the line coupler response (SLC) and the mains network (SM). There are several approaches for inferring SM by reducing or eliminating the contributions of SLC. One method is to perform VNA calibrations on the power line side of the couplers but this requires disconnecting the couplers from the power lines as part of the calibration. While this may be straightforward in a laboratory setting, it is very undesirable in a small PLC modem or similar device, particularly at the high voltage terminals. An alternative method described here is to measure the coupler response once and then de-embed it from subsequent measurements. This assumes, of course, that the coupler response is time stable.

A simple method for analyzing cascaded networks is to use transmission (ABCD) matrix methods, as individual component responses may be simply multiplied together to get the overall response. In contrast, cascades of components described by S-parameters are generally more tedious to solve because of interactions between the blocks.

To begin this process, we calibrate the VNA using the well-known measurements of reflections with simple open, short and 50 Ohm load terminations and transmission with a simple pass-through connector. We then measure the four 2-port S-parameters of the line coupler ($S_{11}$, $S_{21}$, $S_{12}$ and $S_{22}$) using the VNA code described previously. The transmission matrix may be derived from [5, 12]:

$$A = \frac{(1+S_{11})(1-S_{22})+S_{12}S_{21}}{2S_{21}} \quad (6)$$

$$B = Z_o \frac{(1+S_{11})(1+S_{22})-S_{12}S_{21}}{2S_{21}}$$

$$C = \frac{1}{Z_o} \frac{(1-S_{11})(1-S_{22})-S_{12}S_{21}}{2S_{21}}$$

$$D = \frac{(1-S_{11})(1+S_{22})+S_{12}S_{21}}{2S_{21}}$$

where $Z_O$ is the system characteristic impedance, usually 50 Ohms. If our goal is to analyze the mains impedance, we may consider a lumped representation of the mains as having an admittance Y which has the simple ABCD matrix of (1,0,Y,1). This gives a composite transmission network response of:

$$\begin{pmatrix} A & B \\ C & D \end{pmatrix} \begin{pmatrix} 1 & 0 \\ Y & 1 \end{pmatrix} = \begin{pmatrix} A+BY & B \\ C+DY & D \end{pmatrix} = \begin{pmatrix} A' & B \\ C' & D \end{pmatrix} \quad (7)$$

where $A^1=A+BY$ and $C^1=C+DY$. Using the same reference as previously [5], we can show that $S_{11}$ for the composite network is given by:

$$S_{11} = \frac{(A+B/Zo-C'Zo-D)}{(A'+B/Zo+C'+D)} \quad (8)$$

As $S_{11}$ may be measured, we can solve for Y as a function of the previously measured coupler response and the measured $S_{11}$ for the composite network. Hence, $$Y = \frac{\left(A+\frac{B}{Zo}-CZo-D-S_{11}\left(A+\frac{B}{Zo}+CZo+D\right)\right)}{(B(S_{11}-1)+DZo(S_{11}+1))} \quad (9)$$

Similarly, if Y is known, $S_{11}$ for the mains itself is given by:

$$S_{11} = YZo/(2+YZo) \quad (10)$$

Figure 15:
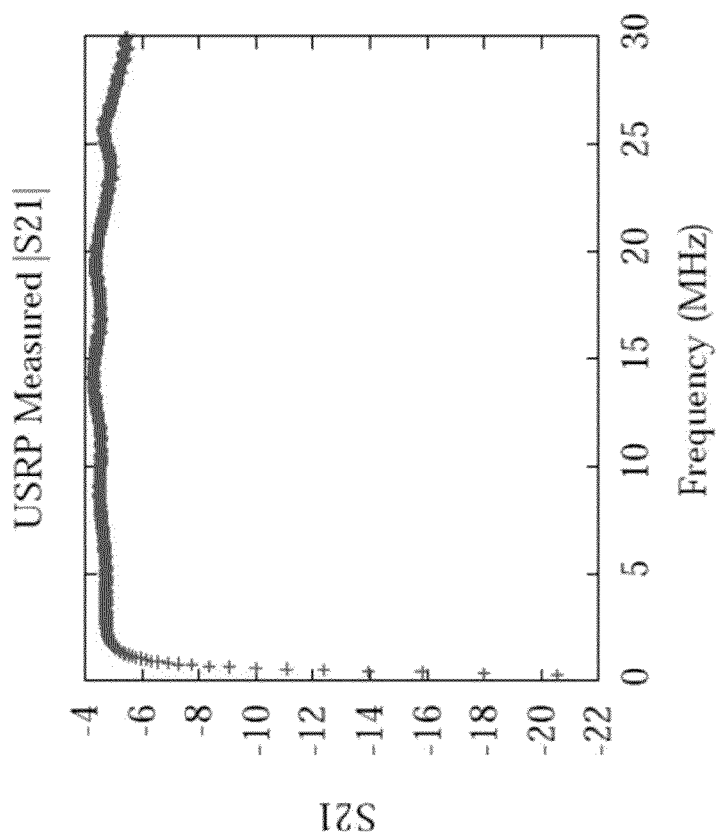
FIG. 15 illustrates measured $|S_{21}|$ of line coupler via USRP based VNA.
Figure 16:
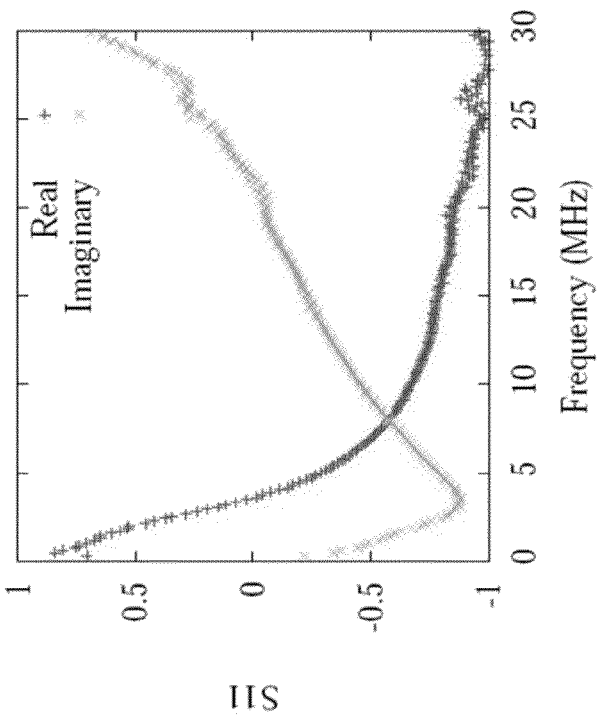
FIG. 16 illustrates measured $S_{11}$ for 1 NF capacitor taken through the line coupler.

Using this methodology we have determined the $S_{11}$ of various test terminations measured through a line coupler and compared them with measurements taken directly via the VNA function. In this case, we have used the line coupler described in [8] and an adapter jig that connects the AC line plug to an RF connector for testing. The measured transmission response for this line coupler is shown in FIG. 15 and the calculated reflectance of the 1 nF test capacitor based upon the de-embedding process described here is presented in FIG. 16. Note that while the curves are similar to the measurements taken directly and shown in FIG. 12, some errors have been introduced by passage through the coupler and the de-embedding process. Even these errors can be nulled around a known load, however, by adjusting the coupler response to correct for this error.

A similar de-embedding procedure may be applied to the transmission case $S_{21}$ that uses line couplers on each side of a section of a power line or by simply performing ground, short and 50 Ohm calibrations through the line couplers where it is feasible to do so. As mentioned previously, however, this measurement may be difficult because of the need to physically run RF cable from the VNA to each line coupler with a potentially favorable alternative being calculation based upon correlated summing of impulse responses from one interface to another.

Experimental Powerline Results

Figure 17:
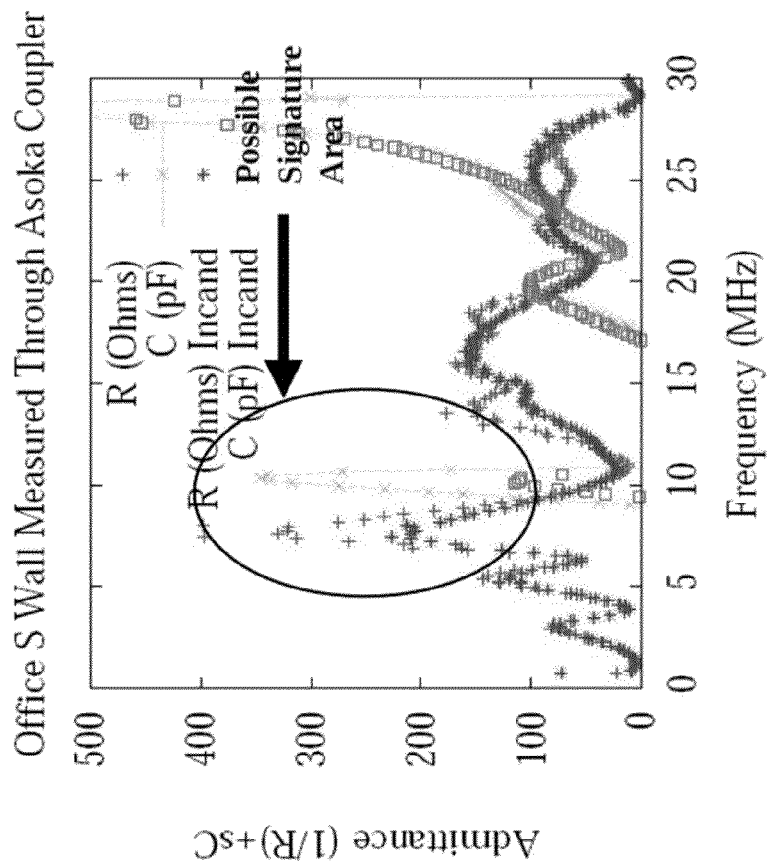
FIG. 17 illustrates USRP measured line admittance with an off/on 70 watt nearby incandescent lamp (~10 feet away).

Using the above hardware and the previously described de-embedding procedure, we have performed $S_{11}$ measurements of the power lines with various attached devices. Samples of these measurements (illustrated as admittance), shown in FIGS. 17 and 18 demonstrate the impact of the state of nearby devices, such as turned-on lamps or an uninterruptable power supply (UPS) on the line characteristics. In FIG. 17, line measurements with a nearby desk lamp turned off and on (on is labeled 'Incand') are shown, clearly showing a region of significant change in power line characteristics. With training, this frequency region (circled in FIG. 17) could be used for load or state sensing by detecting this change in line characteristic.

Figure 18:
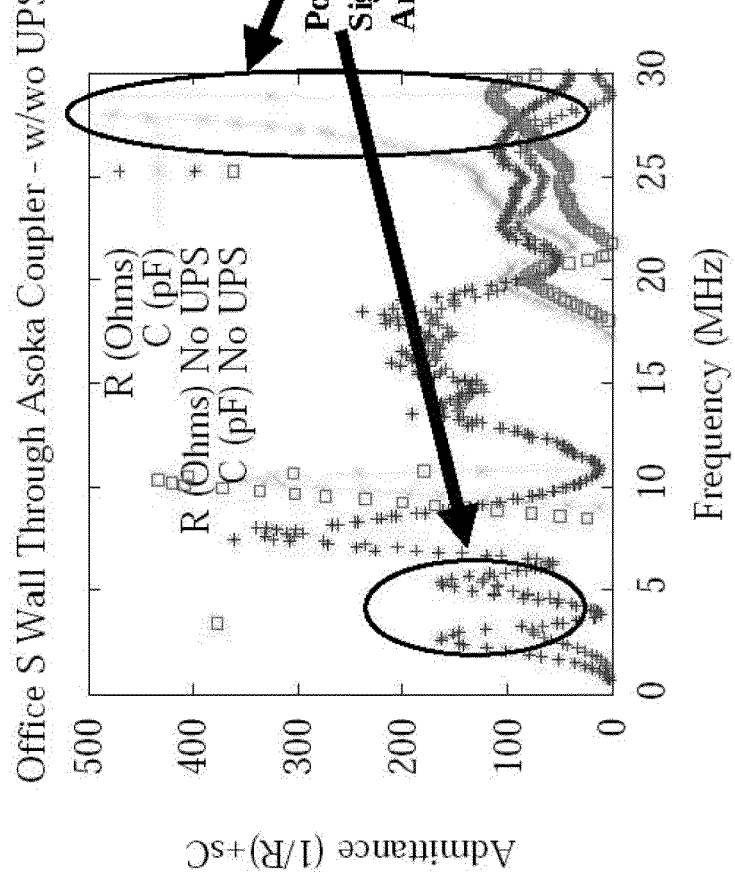
FIG. 18 illustrates USRP measured line admittance with and without a nearby UPS (~10 feet away).

A similar situation is shown in FIG. 18 where a nearby UPS is turned on and off. Changes in these circled regions are for these particular devices diagnostic as to the state of the lamp or the UPS. These same signature trends may or may not be the same for other devices of the same type, but it seems likely that many nearby device states could be recognized with minimal training. Passive devices could also be used that create distinguishable power line admittance changes based upon a sensor state or condition. Finally, knowledge of the detailed line reflectance parameters could potentially be used to provide adaptive interface matching for the purpose of improved signaling performance (i.e. reduced signal loss due to line-interface mismatch).

Thus, in this example, we have demonstrated that relatively simple and inexpensive open source hardware and software may be used to measure scattering parameters of an active low voltage power line. These measurements have been shown to be sensitive to the state of various nearby electrical devices such that details of the measurement may plausibly be used for some types of load or state sensing. Finally, the software and hardware requirements are simple and relatively compatible with traditional PLC interface circuits such that incorporation of this S-parameter measurement function into PLC modems appears very feasible for the purpose of sensing or improved transmission performance.

Therefore a power line carrier modem and related apparatus and methods have been disclosed. As used herein, use of the term "power line carrier modem" or "power line modem" need not perform data receiving functions or be configured to perform data receiving functions. The capability of performing data receiving functions in such a modem is optional.

The present invention contemplates numerous options, variations, and alternatives. For example, the present invention contemplates that the directional coupler and a line coupler may be combined as well as variations in the number of channels associated with a PLC modem, and other variations, and other variations in structure and configuration. The present invention further contemplates that VNAs or directional couplers may be used on live power lines for various purposes including load or state sensing as well as improved communication channel performance.

REFERENCES

References cited to in the description are provided herein. All of these references are herein incorporated by reference in their entireties.

1. J. Newbury, "Experimental developments towards an international standard for PLT", Keynote presentation of the ISPLC 2005; http://conferences.ece.ubc.ca/isplc2005/Keynote_Newbury.ppt
2. M. Gasperi, D. Jensen and D. Rollay, "Method for AC powerline impedance measurement", *IEEE Trans on Ind. Applic.*, vol. 44, no. 4, July/August 2008, pp. 1034-1037.
3. E. Liu, Y. Gao, O. Bilal and T. Korhonen, "Broadband characterization of indoor powerline channel", *Proc. of the ISPLC* 2004, pp. 22-26.
4. http://en.wikipedia.org/wiki/File:Vna3.png
5. D. Pozar, Microwave Engineering, Addison Wesley, 1998, ISBN 0-471-17096-8.
6. T. McDermott and K. Ireland, "A low-cost 100 Mhz vector network analyzer with USB interface", *QEX magazine*, July/August, 2004, pp. 3-14.
7. http://www.emc.polito.it/software/IdEM/idem_home.asp
8. W. Black, "Data Transmission through distribution transformers without bypass components", *Proc. Of the ISPLC* 2010, pp. 13-17, Mar. 29-31, 2010.
9. http://www.gnuradio.org/trac
10. http://www.ettus.com
11. http://www.swigerco.com/gnuradio/phase/vna_comp/
12. ibid [5], pg. 211.
13. W. Black, "Power line s-parameter characterization using open-source tools", *Proc. Of the ISPLC* 2010, pp. 62-66, Mar. 29-31, 2010.

What is claimed is:

1. A power line device configured for coupling to AC power lines, comprising:
    a processor;
    an output from the processor;
    a plurality of inputs to the processor; and
    a directional coupler operatively connected to the output, the plurality of inputs, and the AC power lines via a line coupler;
    wherein the directional coupler is operably connected to the output from the processor via a digital-to-analog (D/A) output channel;
    wherein the processor output operably connected to the directional coupler is also operably connected to one of the plurality of inputs to the processor via a first analog-to-digital (A/D) converter input line;
    wherein the directional coupler provides a coupled output to the processor at one of the plurality of inputs to the processor via a second analog-to-digital (A/D) converter input line;
    wherein the processor is configured to monitor the coupled output from the directional coupler and the output of the processor and analyze reflectance or perform vector network analysis functions using the coupled output from the directional coupler and the output of the processor.

2. The power line device of claim 1 wherein the output from the processor comprise an output bus.

3. The power line device of claim 1 wherein the power line device is configured to indicate power line device transmit frequencies being reflected from the AC power lines or a line coupler operably connected to the power lines.

4. The power line device of claim 1 wherein at least some transmitter functions are implemented in software by the processor to provide a transmit output on the output line.

5. The power line device of claim 1 wherein at least some receiver functions are implemented in software by the processor.

6. The power line device of claim 1 wherein the output of the processor is amplified.

7. The power line device of claim 1 wherein the coupled output is attenuated.

8. The power line device of claim 1 wherein the power line device is a power line carrier modem.

9. A device, comprising:
    a processor;
    a transmit output operatively connected to the processor;
    a plurality of inputs to the processor;
    a directional coupler operatively connected to the transmit output, the plurality of inputs and AC power lines via a line coupler; and
    wherein the processor is configured for communicating a data signal over the AC power lines through the transmit output;
    wherein the directional coupler is operably connected to the output from the processor via a digital-to-analog (D/A) output channel;
    wherein the transmit output operably connected to the directional coupler is also operably connected to one of the plurality of inputs to the processor via a first analog-to-digital (A/D) converter input line;
    wherein the directional coupler provides a coupled output to the processor at one of the plurality of inputs to the processor via a second analog-to-digital (A/D) converter input line;
    wherein the processor is configured to characterize the AC power lines based on vector network analysis measurements performed using the coupled output from the directional coupler and the transmit output;
    wherein the processor is further configured to adjust the transmit output based upon the vector network analysis measurements.

10. A device, comprising:
    a processor having a processor output;
    a line coupler;
    a plurality of inputs to the processor;
    a directional coupler operatively connected to the processor output, the plurality of inputs and AC power lines via the line coupler; and
    wherein the processor is configured for communicating a data signal over the AC power lines;
    wherein the directional coupler is operably connected to the processor output via a digital-to-analog (D/A) output channel;
    wherein the processor output operably connected to the directional coupler is also operably connected to one of the plurality of inputs to the processor via a first analog-to-digital (A/D) converter input line;
    wherein the directional coupler provides a coupled output to the processor at one of the plurality of inputs to the processor via a second analog-to-digital (A/D) converter input line;
    wherein the processor is configured to monitor the coupled output from the directional coupler and monitor the processor output and use the coupled output and the processor output in performing a Vector Network Analysis to recognize one or more devices attached to the power lines based upon the Vector Network Analysis.

11. The device of claim 10 wherein a frequency selective circuit is operatively connected to the AC power lines such that the frequency selective circuit may be recognized by the device.

12. The power line device of claim 10 wherein the device is a power line carrier modem.

13. A power line device configured for coupling to AC power lines, comprising:
    a processor;
    an output from the processor;
    a plurality of inputs to the processor; and
    a directional coupler operatively connected to the output, the plurality of inputs, and the AC power lines via a line coupler;
    wherein the processor is configured to perform transmit functions for transmitting data signals over the AC power lines;
    wherein the directional coupler is operably connected to the output from the processor via a digital-to-analog (D/A) output;
    wherein the processor output operably connected to the directional coupler is also operably connected to one of the plurality of inputs to the processor via a first analog-to-digital (A/D) converter input line;
    wherein the directional coupler provides a coupled output to the processor at one of the plurality of inputs to the processor via a second analog-to-digital (A/D) converter input line;
    wherein the processor is configured to monitor the coupled output from the directional coupler and the output of the processor;
    wherein the power line device is configured to use Vector Network Analysis to recognize one or more devices attached to the power lines based upon the Vector Network Analysis;

wherein a frequency selective circuit is operatively connected to the AC power lines such that the power line device provides for recognizing the frequency selective circuit.

14. A power line device configured for coupling to power lines, comprising:
  a processor;
  an output from the processor;
  a plurality of inputs to the processor;
  a power line coupler operatively connected to the power lines;
  a directional coupler operatively connected to the output, the plurality of inputs, and the power lines via the power line coupler;
  wherein the directional coupler is operably connected to the output from the processor via a digital-to-analog (D/A) output channel;
  wherein the processor output operably connected to the directional coupler is also operably connected to one of the plurality of the inputs to the processor via a first analog-to-digital (A/D) converter input line;
  wherein the directional coupler provides a coupled output to the processor at one of the plurality of inputs to the processor via a second analog-to-digital (A/D) converter input line;
  wherein the processor is configured to use the coupled output from the directional coupler and the processor input connected to the processor output in performing an analysis to provide a reflectance or vector network analysis characterization.

15. The power line device of claim 14 wherein the power lines are AC power lines.

16. The power line device of claim 15 wherein the AC power lines include a line, neutral, and ground.

* * * * *